US012046415B2

(12) United States Patent
Matsumoto et al.

(10) Patent No.: US 12,046,415 B2
(45) Date of Patent: Jul. 23, 2024

(54) METHOD FOR MANUFACTURING DUST CORE AND DUST CORE

(71) Applicant: Seiko Epson Corporation, Toyko (JP)

(72) Inventors: Yasutaka Matsumoto, Suwa (JP); Sukenori Ichikawa, Suwa (JP)

(73) Assignee: SEIKO EPSON CORPORATION (JP)

( * ) Notice: Subject to any disclaimer, the term of this patent is extended or adjusted under 35 U.S.C. 154(b) by 149 days.

(21) Appl. No.: 17/219,927

(22) Filed: Apr. 1, 2021

(65) Prior Publication Data

US 2021/0313110 A1 Oct. 7, 2021

(30) Foreign Application Priority Data

Apr. 2, 2020 (JP) ................................ 2020-066499

(51) Int. Cl.

| | |
|---|---|
| ***H01F 1/24*** | (2006.01) |
| ***B22F 1/08*** | (2022.01) |
| ***B22F 1/14*** | (2022.01) |
| ***B22F 1/16*** | (2022.01) |
| ***B22F 3/093*** | (2006.01) |
| ***H01F 1/38*** | (2006.01) |
| ***H01F 3/08*** | (2006.01) |
| ***H01F 41/02*** | (2006.01) |

(52) U.S. Cl.

CPC ........... *H01F 41/0246* (2013.01); *B22F 1/08* (2022.01); *B22F 1/14* (2022.01); *B22F 1/16* (2022.01); *B22F 3/093* (2013.01); *H01F 1/24* (2013.01); *H01F 3/08* (2013.01); *B22F 2201/00* (2013.01); *B22F 2202/01* (2013.01); *B22F 2202/11* (2013.01); *B22F 2998/10* (2013.01); *B22F 2999/00* (2013.01); *H01F 1/38* (2013.01)

(58) Field of Classification Search

CPC ......................... B22F 2999/00; B22F 2998/10
See application file for complete search history.

(56) References Cited

U.S. PATENT DOCUMENTS 5,160,447 A 11/1992 Ishikawa et al.
2005/0242460 A1 11/2005 Ishihara et al.
(Continued)

FOREIGN PATENT DOCUMENTS

CN 104498806 A * 4/2015
CN 107498035 A * 12/2017
(Continued)

OTHER PUBLICATIONS

Jang, Pyungwoo, and Seungchan Shin. "Properties of Fe—Al Cores Made From Fe—Al Powders Annealed in a Damp Hydrogen Atmosphere." IEEE transactions on magnetics 49.1 (2012): 11-14 (Year: 2012).*

*Primary Examiner* — Samir Shah
*Assistant Examiner* — Sean P. O'Keefe
(74) *Attorney, Agent, or Firm* — Harness, Dickey & Pierce, P.L.C.

(57) ABSTRACT

A method for manufacturing a dust core, includes: applying energy to a surface of a soft magnetic powder coated with an insulating body containing a compound having an aluminum-oxygen bond; exposing the soft magnetic powder to an atmosphere having a dew point of −30° C. or higher and 15° C. or lower under an atmospheric pressure; and forming a molded product by pressing the soft magnetic powder at 20 MPa or more and 400 MPa or less.

5 Claims, 2 Drawing Sheets

(56) References Cited

U.S. PATENT DOCUMENTS

| | | | | |
|---|---|---|---|---|
| 2007/0051430 | A1 | 3/2007 | Ishihara et al. | |
| 2012/0267585 | A1* | 10/2012 | Wang | C09K 11/06 252/301.16 |
| 2015/0371746 | A1* | 12/2015 | Takashita | H01F 1/26 252/62.55 |
| 2018/0114631 | A1* | 4/2018 | Ida | H01F 27/324 |
| 2018/0169759 | A1* | 6/2018 | Nakamura | C22C 38/16 |
| 2018/0229442 | A1* | 8/2018 | Ucar | B33Y 40/10 |
| 2019/0333678 | A1 | 10/2019 | Kubota et al. | |
| 2023/0039573 | A1 | 2/2023 | Kubota et al. | |

FOREIGN PATENT DOCUMENTS

| | | | | |
|---|---|---|---|---|
| CN | 110610803 | A | * 12/2019 | H01F 1/33 |
| JP | S47-22514 | | 11/1972 | |
| JP | S49-4197 | A | 1/1974 | |
| JP | S50-14207 | A | 2/1975 | |
| JP | H01-223704 | A | 9/1989 | |
| JP | 2004-146804 | A | 5/2004 | |
| WO | 2018/131536 | A1 | 7/2018 | |

* cited by examiner

METHOD FOR MANUFACTURING DUST CORE AND DUST CORE

The present application is based on, and claims priority from JP Application Serial Number 2020-066499, filed Apr. 2, 2020, the disclosure of which is hereby incorporated by reference herein in its entirety.

BACKGROUND

1. Technical Field

The present disclosure relates to a method for manufacturing a dust core and a dust core.

2. Related Art

In the related art, a dust core formed by compacting a soft magnetic powder is known. Such a dust core is used in magnetic cores such as inductors, or toroidal coils. For example, JP-A-2004-146804 discloses a method for manufacturing a dust core in which a mixed powder including an iron powder whose surface is coated with a phosphoric acid compound and a resin powder is formed with a compressive stress of 700 MPa to 2000 MPa.

However, the method for manufacturing a dust core described in JP-A-2004-146804 has a problem that it is difficult to reduce an iron loss. Specifically, since the compressive stress at a time of compacting is high, processing strain is likely to occur in the dust core. When the processing strain occurs, a hysteresis loss increases and the iron loss also increases. That is, there is a demand for the method for manufacturing a dust core that prevents the occurrence of the processing strain and reduces the iron loss.

SUMMARY

A method for manufacturing a dust core, includes: applying energy to a surface of a soft magnetic powder coated with an insulating body containing a compound having an aluminum-oxygen bond; exposing the soft magnetic powder to an atmosphere having a dew point of −30° C. or higher and 15° C. or lower under an atmospheric pressure; and forming a molded product by pressing the soft magnetic powder at 20 MPa or more and 400 MPa or less.

A dust core is formed by compacting a soft magnetic powder coated with an insulating body containing a compound having an aluminum-oxygen bond, in which a film thickness of the insulating body is 2 nm or more and 50 nm or less, one particle and the other particle of the soft magnetic powder are in contact with each other via the insulating body, and an iron loss at an applied frequency of 50 kHz is 5 kW/m$^3$ or more and less than 270 kW/m$^3$ at a maximum magnetic flux density of 50 mT.

DESCRIPTION OF EXEMPLARY EMBODIMENTS

1. First Embodiment 1.1. Dust Core

Figure 1:
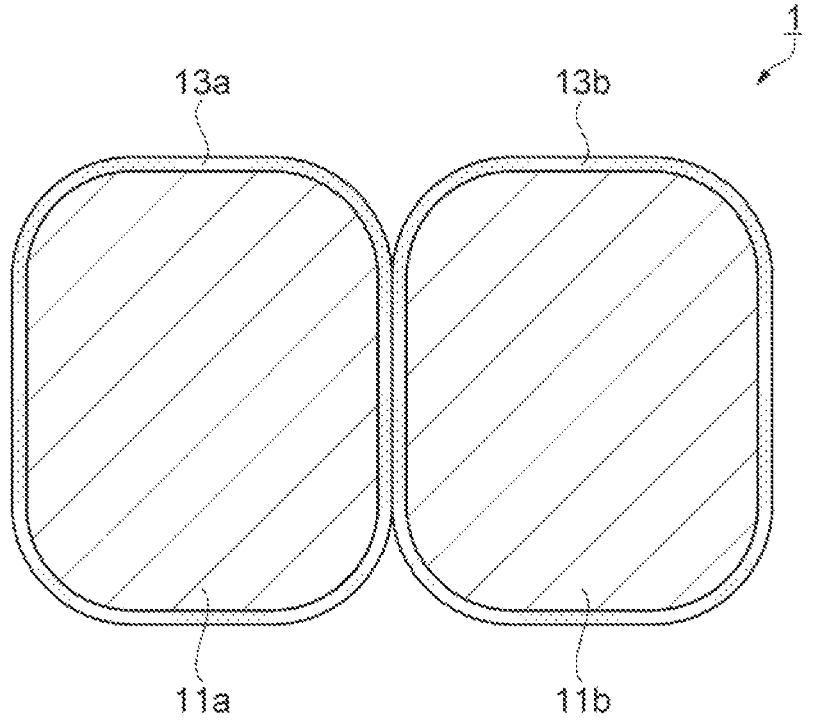
FIG. 1 is a schematic cross-sectional view showing a configuration of a dust core according to a first embodiment.

A dust core 1 according to a first embodiment is manufactured by a method for manufacturing the dust core 1 described later. The dust core 1 is applied to a magnetic core such as an inductor. Hereinafter, a soft magnetic powder, an insulating body, or the like contained in the dust core 1 will be described with reference to FIG. 1. Here, FIG. 1 schematically shows an enlarged state of two particles of the soft magnetic powder in the dust core 1. Therefore, shapes, positional relationships, or the like of the two particles do not necessarily match an actual state.

The dust core 1 is formed by compacting the soft magnetic powder coated with the insulating body, which will be described later. As shown in FIG. 1, in the dust core 1, a particle 11*a*, which is one particle of the soft magnetic powder, and a particle 11*b*, which is another particle of the soft magnetic powder, are adjacent to each other.

The particle 11*a* and the particle 11*b* are in contact with each other via the insulating body. In FIG. 1, a form in which an insulating body 13*a* coating the particle 11*a* and an insulating body 13*b* coating the particle 11*b* are interposed between the particle 11*a* and the particle 11*b* is shown, but the disclosure is not limited thereto. Specifically, at least one of the insulating bodies 13*a* and 13*b* may be interposed between the particle 11*a* and the particle 11*b*. For example, when the insulating bodies 13*a* and 13*b* are formed in an island shape, either the insulating body 13*a* or the insulating body 13*b* may be interposed between the particle 11*a* and the particle 11*b*. From a viewpoint of an insulating function of the insulating body, or an effect of bonding between the soft magnetic powders described later, it is preferable that the insulating body 13*a* and the insulating body 13*b* are interposed between the particle 11*a* and the particle 11*b*. Details of the insulating bodies 13*a* and 13*b* will be described later.

In the dust core 1, a plurality of soft magnetic powder particles including the particles 11*a* and 11*b* are densely gathered and are in contact with each other via a coating film, i.e., an insulating body such as the insulating bodies 13*a* and 13*b*. In the following description, the insulating bodies 13*a* and 13*b* are also collectively referred to as the insulating body, and the plurality of soft magnetic powder particles including the particles 11*a* and 11*b* are also collectively referred to as the soft magnetic powder.

The dust core 1 has an iron loss of 5 kW/m$^3$ or more and less than 270 kW/m$^3$ at a maximum magnetic flux density of 50 mT at an applied frequency of 50 kHz. A method for measuring the iron loss will be described later.

1.1.1. Soft Magnetic Powder

The soft magnetic powder is a particle including a soft magnetic material. Examples of the soft magnetic material include, for example, pure iron, various Fe-based alloys including Fe—Si-based alloys such as silicon steel, Fe—Ni-based alloys such as Permalloy, Fe—Co-based alloys such as Permenzur, Fe—Si—Al-based alloys such as Sendust, Fe—Cr—Si-based alloys, and Fe—Cr—Al-based alloys, various Ni-based alloys, and various Co-based alloys. Of these alloys, it is preferable to use the various Fe-based alloys from a viewpoint of magnetic properties such as magnetic permeability and magnetic flux density, and productivity such as cost.

Examples of the crystallinity of the soft magnetic material include crystalline and amorphous properties. Of these crystallinities, it is preferable that the soft magnetic material has an amorphous phase such as the amorphous property from a viewpoint of reducing a coercive force.

A proportion of the amorphous phase in the soft magnetic material is not particularly limited, but is preferably, for example, 10 vol % or more, and more preferably 40 vol % or more. Accordingly, a hysteresis loss is reduced, the magnetic permeability and the magnetic flux density are improved, and the iron loss is reduced when the compacting is performed.

Examples of the soft magnetic material capable of forming an amorphous or microcrystalline material include Fe-based alloys such as Fe—Si—B-based, Fe—Si—B—C-based, Fe—Si—B—Cr—C-based, Fe—Si—B—Mn—C-based, Fe—Si—Cr-based, Fe—B-based, Fe—P—C-based, Fe—Co—Si—B-based, Fe—Si—B—Nb-based and Fe—Zr—B-based, Ni-based alloys such as Ni—Si—B-based and Ni—P—B-based, Co-based alloys such as Co—Si—B-based, or the like. As the soft magnetic powder, a plurality of types of soft magnetic materials having different crystallinities may be used.

The soft magnetic material is preferably 50 vol % or more, more preferably 80 vol % or more, and further more preferably 90 vol % or more, based on a filling volume of the soft magnetic powder. Accordingly, a soft magnetism of the soft magnetic powder is improved. The filling volume refers to an actual volume occupied by the soft magnetic powder in a powder compact obtained by compacting the soft magnetic powder, and can be measured by a liquid replacement method, a gas replacement method, or the like.

The soft magnetic powder may contain impurities or additives in addition to the soft magnetic material. Examples of the additives include various metal materials, various non-metal materials, and various metal oxide materials.

A surface of the soft magnetic powder may be oxidized to form an oxide layer. Accordingly, the surface of the soft magnetic powder is oxidized and coated with the oxide layer, so that when the coating film, i.e., the insulating body described later is formed, it is possible to strengthen a van der Waals bond or a chemical bond between the coating film, i.e., the insulating body and the surface of the soft magnetic powder, enhance an adhesion between the coating film, i.e., the insulating body and the surface of the soft magnetic powder, and impart high insulation property to the soft magnetic powder.

An average particle size of the soft magnetic powder is not particularly limited, but is, for example, 0.25 μm or more and 250.00 μm or less. Here, the average particle size in the present specification refers to a volume-based particle size distribution (50%). The average particle size is measured by a dynamic light scattering method or a laser diffracted light method described in JIS 28825. Specifically, for example, a particle size distribution meter using the dynamic light scattering method as a measurement principle can be adopted.

A method for manufacturing the soft magnetic powder is not particularly limited, and examples thereof include known manufacturing methods such as various atomizing methods such as a water atomizing method, a gas atomizing method, a high-speed rotating water flow atomizing method, a reduction method, a carbonyl method, and a pulverization method. Of these methods, it is preferable to adopt the atomizing method from a viewpoint of efficiently manufacturing fine particles while preventing variations in a particle size.

1.1.2. Insulating Body

The insulating body coats at least a part of the surface of the soft magnetic powder in the island shape, for example. Even when the coating film, i.e., the insulating body with respect to the soft magnetic powder has the island shape, the effect of bonding between the soft magnetic powders described later is exhibited. However, from a viewpoint of increasing the insulating function of the insulating body or the above effect, it is preferable that the insulating body coats an entire surface of the soft magnetic powder. Here, in the following description, the coating film, i.e., the insulating body that coats the soft magnetic powder is also referred to as an insulating coating film.

A film thickness of the insulating coating film is 2 nm or more and 50 nm or less, preferably 2 nm or more and 10 nm or less, and more preferably 2 nm or more and 4 nm or less from the viewpoint of the insulating function. The film thickness of the insulating coating film can be known from an average value of film thicknesses measured at five or more points by observing a cross section of the soft magnetic powder provided with the insulating coating film with a transmission electron microscope or the like.

A volume resistivity of the insulating body is $1\times10^{14}$ Ω·cm or more and $1\times10^{17}$ Ω·cm or less. Accordingly, a DC dielectric strength and the magnetic permeability of the soft magnetic powder coated with the insulating body are improved. For the volume resistivity of the insulating body, a known numerical value or a known measuring method can be adopted.

The insulating body contains a compound having an aluminum-oxygen bond. A material for forming the insulating body is not particularly limited as long as an aluminol group having a hydroxyl group is formed by applying energy and reacting with moisture, which will be described later. Specifically, examples of the material include organoaluminum compounds such as aluminoxane having the aluminum-oxygen bond and an alkyl group, an epoxy group, an acrylic group, a polyester group, or the like.

The organoaluminum compound having such an aluminum-oxygen bond is not particularly limited, and examples thereof include aluminum alkoxides such as trimethoxyaluminum, triethoxyaluminum, and aluminum isopropoxide, and polymethylaluminoxane. For the insulating body, one type or a plurality of types of these forming materials are used.

1.1.3. Other Components

The dust core 1 may contain a binder as another component, if necessary. Examples of the binder include known binders such as a resin binder or an inorganic binder. Here, in the dust core 1 according to the present disclosure, the aluminol group having a hydroxyl group or a dangling bond forms a bond between the soft magnetic powders, so that the binder is not used or an amount of the binder used as compared with a case in the related art can be reduced. A formation and an action of the aluminol group and the dangling bond will be described later.

The resin binder is not used for the dust core 1 according to the present embodiment. Since the resin binder is not used, it is not necessary to fluidize the resin binder at a time of compacting or to heat the resin binder for burning off when firing a compacted molded product, and therefore, a firing temperature can be lowered as compared with a case where the resin binder is used. Further, since an organic matter derived from the resin binder does not remain in the dust core 1, it is possible to avoid aging deterioration of the dust core 1 due to heat. Further, when the soft magnetic powder of the dust core 1 has the amorphous phase, crystallization due to heat can be prevented.

The dust core 1 may contain a known additive, a non-magnetic powder, or the like in addition to the binder.

1.2. Method for Manufacturing Dust Core

Figure 2:
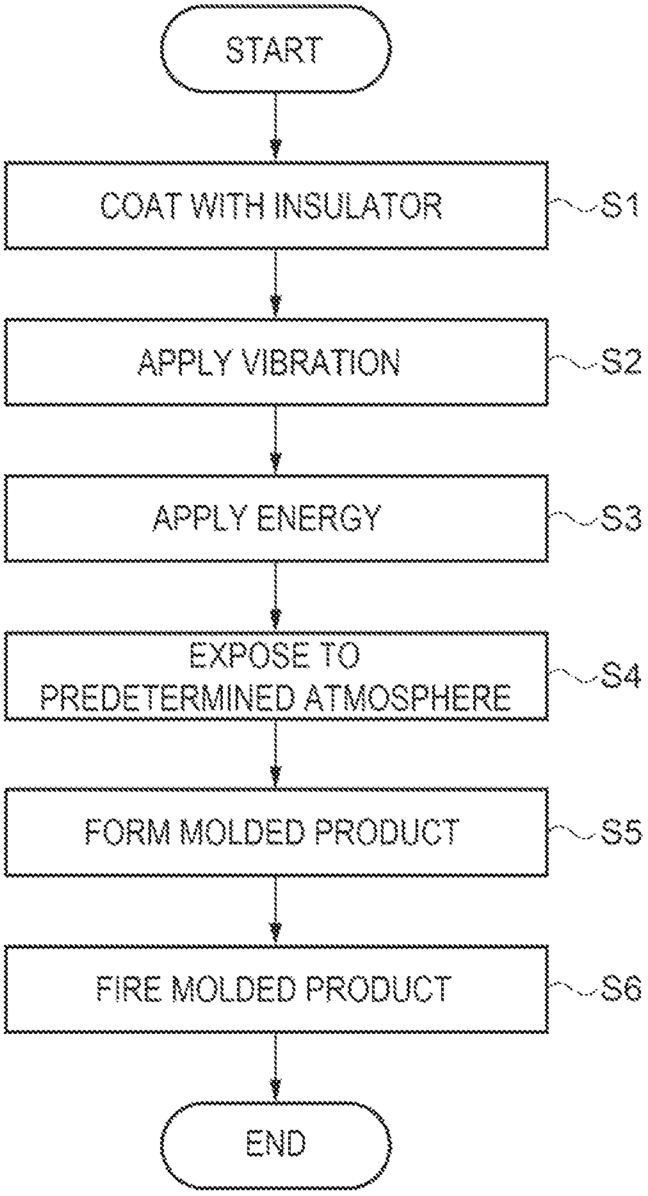
FIG. 2 is a process flow chart showing a method for manufacturing a dust core.

The method for manufacturing the dust core 1 according to the first embodiment will be described with reference to FIG. 2. As shown in FIG. 2, the method for manufacturing the dust core 1 includes steps S1 to S6. A process flow shown in FIG. 2 is an example and the method is not limited thereto.

In step S1, first, the surface of the soft magnetic powder may be pretreated to remove deposits such as the organic matter or improve wettability. Examples of the pretreatment include ozone treatment, plasma treatment, or the like.

Specifically, in the ozone treatment, the soft magnetic powder is exposed to an atmosphere having an ozone concentration of 5000 ppm for 10 minutes or more. In the plasma treatment, gases such as helium (He), argon (Ar), nitrogen ($N_2$), water ($H_2O$), oxygen ($O_2$), and neon (Ne) are used in atmospheric pressure plasma or vacuum plasma.

A contact angle of the water is used as an index of the wettability of the surface of the soft magnetic powder. The contact angle of the water after the pretreatment on the surface of the soft magnetic powder is set to 15° or less. Accordingly, the adhesion of the insulating body to the soft magnetic powder is improved. The contact angle of the water can be measured by a permeation rate method based on a Lucas-Washburn equation or the like.

Next, the surface of the soft magnetic powder is coated with the insulating body to form the insulating coating film. Examples of a method for forming an insulating coating film on the soft magnetic powder include a sol-gel method, a plasma chemical vapor deposition (CVD) method, an atomic layer deposition (ALD) method, a coating method, or the like.

In order to form the organoaluminum compounds as the insulating coating film by the sol-gel method, for example, the following method can be adopted. Aluminum alkoxides such as trimethoxyaluminum having a plurality of alkoxy groups are dispersed in alcohol. Further, in order to replace the alkoxy groups contained in the aluminum alkoxide with the hydroxyl group, water and a basic compound such as ammonia are added and stirred. Then, by adding the soft magnetic powder to a mixture and stirring the powder, the surface of the soft magnetic powder is coated with the organoaluminum compounds. The formed insulating coating film may be heat-treated. This heat treatment is carried out at a temperature not exceeding a firing temperature of step S6 described later.

In order to form the organoaluminum compounds as the insulating coating film by the plasma CVD method, for example, the following method can be adopted. A mixture of an alkylaluminum or the aluminum alkoxide and a rare gas such as argon (Ar) or helium (He) and the soft magnetic powder are introduced into a chamber equipped with electrodes and a stirrer. Next, while the soft magnetic powder is stirred, a power of 0.25 $W/cm^2$ or more is applied to the electrodes to deposit the organoaluminum compound on the surface of the soft magnetic powder.

In order to form the organoaluminum compounds as the insulating coating film by the ALD method, for example, the following method can be adopted. The alkylaluminum or the aluminum alkoxide is introduced into a vacuum chamber containing the soft magnetic powder, and monolayers are deposited on the surface of the soft magnetic powder. After that, excess alkylaluminum or aluminum alkoxide is removed by replacement with nitrogen gas or the like. Next, an oxidizing agent such as ozone gas is introduced to oxidize the alkylaluminum or the aluminum alkoxide deposited on the surface of the soft magnetic powder, and then an excess oxidizing agent is removed by the replacement with the nitrogen gas or the like. Then, the alkylaluminum or the aluminum alkoxide is introduced again. By repeating the above process, the insulating coating film is formed.

In order to form the organoaluminum compounds as the insulating coating film by the coating method, for example, the following method can be adopted. While stirring the soft magnetic powder in a container equipped with the stirrer, the alkylaluminum such as a trimethylaluminum or the above aluminum alkoxide is charged into the container and applied to the surface of the soft magnetic powder. Next, the heat treatment is performed to obtain the insulating coating film. Then, the process proceeds to step S2.

In step S2, vibration is applied to the soft magnetic powder provided with the insulating coating film. By applying this vibration, an agglomerated soft magnetic powder is peptized and each soft magnetic powder particle is rotated. This rotation makes it possible for each soft magnetic powder particle to change a direction with respect to an energy source when step S2 and step S3 for applying energy to the soft magnetic powder, which will be described later, are performed at the same time. Accordingly, the energy is applied to the surface of each soft magnetic powder particle while bias is prevented, and the formation of the dangling bond in the insulating body, which will be described later, can be promoted.

A method of applying vibration is not particularly limited as long as the agglomerated soft magnetic powder is peptized and rotation is enabled. Specific examples include a method using sound waves or ultrasonic waves, a rotating body, an air flow, or the like.

For example, a woofer or the like is used in the method using the sound waves, and an ultrasonic oscillator or the like is used in the method using the ultrasonic waves. In the method using the rotating body, an eccentric motor, a stirring blade, or the like may be used, or a container accommodating the soft magnetic powder may be rotated. In the method using the air flow, a device equipped with a jet layer with a draft tube, or the like is used. A known powder processing device or the like may be applied to apply these vibrations. Further, one type of these methods may be used alone, or two or more types of these methods may be used in combination. Examples of used in combination include a method in which the soft magnetic powder is subjected to lateral vibration by a motor and vertical vibration applied by the sound waves from the woofer. In the same manner as in step S2, the vibration may be applied to the soft magnetic powder before forming the insulating coating film.

In the present embodiment, step S2 is performed before a step of applying the energy in the subsequent step S3. Further, step S2 may be performed at the same time as step S3. Accordingly, the soft magnetic powder is peptized and at least a part of the soft magnetic powder rotates due to the vibration. That is, the energy is applied while the soft magnetic powder changes a position. Therefore, the energy is applied to each surface of the soft magnetic powder while the bias is prevented, and a division of a molecular chain in the insulating body can be promoted. Further, in the same manner as in step S2, the vibration may be applied to the soft magnetic powder before forming the insulating coating film. Then, the process proceeds to step S3.

In step S3, the energy is applied to the surface of the soft magnetic powder coated with the insulating body containing the organoaluminum compound having the aluminum-oxygen bond. A method of applying energy is not particularly limited as long as a part of the molecular chain constituting the insulating body is divided to generate the dangling bond. Specific examples thereof include the plasma treatment, the ozone treatment, ultraviolet irradiation treatment, or the like.

When the insulating body is the above organic compound, it is preferable that an organic group having a side chain or a substituent in a molecular structure is eliminated and the organic group is decomposed by applying the energy. Accordingly, in the insulating body, at least a part of the organic group is eliminated and the organic matter is reduced. Therefore, when the molded product is fired in the subsequent step S6, the organic matter can be easily burned and the firing temperature can be lowered. Further, since the organic matter is less likely to remain in the dust core 1, it is possible to prevent the aging deterioration due to the heat of the dust core 1.

In the above organoaluminum compound used as the insulating body in the present embodiment, the organic group such as the side chain is divided by applying the energy, and the dangling bond is generated. The divided organic group may be decomposed by applying the energy, or may be discharged from a system as carbon dioxide, water, methyl alcohol, or the like.

In the present embodiment, a method of exposing the soft magnetic powder to an ionized gas or the ozone gas is used to apply the energy. Due to the plasma treatment exposed to the ionized gas and the ozone treatment exposed to the ozone gas, the above dangling bond is generated.

In the plasma treatment, examples of treatment gas include, for example, the rare gas such as argon (Ar), helium (He), and neon (Ne), nitrogen ($N_2$), oxygen ($O_2$), air and these gases with water added, water alone, or the like. The plasma treatment is preferably the atmospheric pressure plasma or the vacuum plasma, and a treatment pressure is preferably from atmospheric pressure to 1 Pa. The plasma treatment is possible even with a higher vacuum than the above condition, but treatment efficiency is low since an amount of elements used for the treatment is small. When the atmospheric pressure plasma is used or when the treatment gas contains moisture, a hydroxyl group may be generated from the water and the dangling bond in addition to the generation of the dangling bond in the insulating body.

The plasma treatment may be a direct current discharge or an alternating current discharge having a frequency of 2.45 GHz or less. When a high frequency is applied, the soft magnetic powder is subjected to induction heating, so that a remote plasma method with a plasma source outside a processing chamber is adopted. Further, when a processing frequency is 10 kHz or less, the induction heating in the soft magnetic powder is slight, so that a direct discharge may be performed in the processing chamber.

In the ozone treatment, the soft magnetic powder is exposed to an atmosphere having an ozone concentration of 5000 ppm or more for 10 minutes or more. Then, the process proceeds to step S4.

In step S4, the soft magnetic powder to which the energy is applied is exposed to an atmosphere having a dew point of −30° C. or higher and 15° C. or lower under the atmospheric pressure. The dew point under the atmospheric pressure to be exposed is preferably −20° C. or higher and 0° C. or lower. Accordingly, the moisture in the atmosphere acts on the dangling bond generated in the soft magnetic powder, and the hydroxyl group is formed from the dangling bond and the moisture. The formation of the hydroxyl group proceeds more significantly on the surface than on the inside of the insulating body. When the dew point under the atmospheric pressure is in the above range, the formation of the hydroxyl group can be promoted and dew condensation can be prevented. It is not necessary for all dangling bonds generated in the insulating body to be hydroxyl groups. Then, the process proceeds to step S5.

In step S5, the soft magnetic powder exposed to the above atmosphere forms the molded product. Step S5 is a so-called compacting step. When the soft magnetic powders are formed, the hydroxyl groups form a hydrogen bond between adjacent soft magnetic powders, and the dangling bonds form a covalent bond. A shape of the molded product is a desired shape such as a ring shape, a rod shape, or a cube according to the use of the dust core 1. Further, a coiled lead wire or the like may be embedded in the molded product.

The molded product is formed from the soft magnetic powder by pressing at 20 MPa or more and 400 MPa or less using a mold corresponding to the shape of the dust core 1. The pressing is preferably performed at 250 MPa or more and 350 MPa or less. As described above, even when the pressing force, which is a compressive stress at the time of compacting, is lowered as compared with the case in the related art, the hydrogen bond or the covalent bond is formed between the adjacent soft magnetic powders, and the shape of the molded product is maintained. Accordingly, an occurrence of processing strain at the time of compacting is prevented.

In the present embodiment, since the organoaluminum compound having the aluminum-oxygen bond is used as the material for forming the insulating body, the hydrogen bond is formed between the aluminol groups of the insulating body. Further, an aluminoxane bond (Al—O—Al structure) is formed from a structure in which the dangling bond is generated in an Al atom and an Al-O structure in which the dangling bond is generated on an O atom side. Then, the process proceeds to step S6.

In step S6, the molded product is fired at a temperature of 100° C. or higher and 400° C. or lower. The firing temperature of the molded product is preferably 120° C. or higher and 250° C. or lower. A firing time is not particularly limited, and is, for example, 0.5 hours or more and 5.0 hours or less. Accordingly, the aluminoxane bond is formed by a dehydration condensation reaction between the aluminol groups of the insulating body, and the adjacent soft magnetic powders are firmly bonded to each other. In addition, unnecessary organic matters, or the like in the molded product are eliminated by firing. Further, since the firing temperature is relatively low, the crystallization of the amorphous phase is prevented when the soft magnetic powder has the amorphous phase.

The dust core 1 according to the present embodiment is manufactured through the above steps. The dust core 1 according to the present embodiment is suitably used for magnetic cores such as toroidal coils, inductors, reactors, transformers, motors and generators, and magnetic elements other than the magnetic cores such as antennas and electromagnetic wave absorbers.

According to the present embodiment, the following effects can be obtained.

It is possible to prevent the occurrence of the processing strain in the dust core 1 and reduce the iron loss. Specifically, the application of the energy divides a part of the molecular chain constituting the insulating body to generate the dangling bond. Then, by being exposed to an atmosphere containing a predetermined humidity, the dangling bond and the moisture form the hydroxyl group. The formation of the hydroxyl group occurs more prominently on the surface than the inside of the insulating body that coats the soft magnetic powder. Since the insulating body according to the present embodiment is the organoaluminum compound having the aluminum-oxygen bond, the aluminol group having the hydroxyl group is formed.

Since the hydrogen bonds are formed between the hydroxyl groups, the adjacent soft magnetic powders are bonded to each other by the hydrogen bonds. In addition, the adjacent soft magnetic powders are also bound to each other by the covalent bonds due to the dehydration condensation reaction between the hydroxyl groups and the covalent bonds between the dangling bonds. Since these bonds are formed, even when the pressing is performed with a compressive stress lower than that in the related art, the soft magnetic powders are bonded to each other and the shape of the molded product is easily maintained. Therefore, the compressive stress at the time of compacting is kept low, the occurrence of the processing strain is prevented, and the hysteresis loss can be reduced.

Further, in the dust core 1, the insulating bodies such as the insulating bodies 13*a* and 13*b* are interposed between the adjacent soft magnetic powders. Since these insulating coating films have the aluminoxane bond, impedance is relatively high, and an eddy current loss of the dust core 1 can be reduced. Further, the iron loss at an applied frequency of 50 kHz is kept relatively low. Accordingly, it is possible to provide a method for manufacturing the dust core 1 and the dust core 1 in which both the hysteresis loss and the eddy current loss, that is, the iron losses are reduced.

Since the agglomerated soft magnetic powder is peptized by the application of the vibration, the energy is applied to each surface of the soft magnetic powder while the bias is prevented. Therefore, the division of the molecular chain in the insulating body can be promoted.

The molecular chain on the surface of the insulating body can be divided by the ionized gas or the ozone gas. Further, since the energy is applied by the gas, it is possible to wrap the gas inside the agglomerated soft magnetic powder. Accordingly, the energy is applied from all sides of the surface of the soft magnetic powder, and it is possible to prevent a positional bias on the surface of the soft magnetic powder and divide the molecular chain.

When the soft magnetic powder has the amorphous phase as when the soft magnetic powder is an amorphous powder or a heteroamorphous powder, or a case where the soft magnetic powder is a nanocrystal powder, the coercive force of the soft magnetic powder is reduced and the hysteresis loss is reduced. Further, in the method for manufacturing a dust core in the related art, when the soft magnetic powder has the amorphous phase, the amorphous phase is crystallized by heating and the hysteresis loss is likely to increase. In particular, the crystallization tends to be promoted in the heat treatment for the fluidization or the burning off of the binder used at the time of compacting. On the other hand, in the present embodiment, the occurrence of the processing strain is prevented and no binder is used. Therefore, the above heat treatment becomes unnecessary, the crystallization of the amorphous phase can be prevented, and the increase in the hysteresis loss can be prevented.

2. Second Embodiment

A method for manufacturing a dust core according to a second embodiment will be described. In the method for manufacturing a dust core according to the present embodiment, the application of the energy and the exposure to a predetermined atmosphere are simultaneously performed as compared with the method for manufacturing the dust core 1 according to the first embodiment. Since parts other than this point are the same as that of the first embodiment, duplicate description will be omitted for a configuration the same as that of the first embodiment. In the following description, FIG. 2 will be referred to for convenience.

In the method for manufacturing a dust core according to the present embodiment, a step of applying the energy and a step of exposing the soft magnetic powder to the predetermined atmosphere are simultaneously performed. That is, in a process flow shown in FIG. 2, step S3 and step S4 are performed in parallel. Specifically, the plasma treatment, the ozone treatment, the ultraviolet irradiation treatment, or the like exemplified in the first embodiment are carried out on the soft magnetic powder in the atmosphere having the dew point of −30° C. or higher and 15° C. or lower under the atmospheric pressure. In the present embodiment, a method the same as in the first embodiment is adopted as the method of applying energy, and the treatment is carried out in the above atmosphere.

The steps other than those described above are carried out in the same manner as the method for manufacturing the dust core 1 according to the first embodiment, and the dust core according to the present embodiment is manufactured. According to the present embodiment, the following effects in addition to the effects according to the first embodiment can be obtained.

Since the division of the molecular chain and the formation of the hydroxyl group in the insulating body are performed in parallel, the formation of the aluminol group having the hydroxyl group can be promoted. In addition, time required for manufacturing the dust core can be shortened.

3. Third Embodiment

A method for manufacturing a dust core according to a third embodiment will be described. In the method for manufacturing a dust core according to the present embodiment, the application of the vibration and the application of the energy are simultaneously performed and the method of applying energy is different with respect to the method for manufacturing the dust core 1 according to the first embodiment. Since parts other than these points are the same as that of the first embodiment, the duplicate description will be omitted for the configuration the same as that of the first embodiment. In the following description, FIG. 2 will be referred to for convenience.

In the method for manufacturing a dust core according to the present embodiment, the vibration is applied to the soft magnetic powder at the same time as the energy in the step of applying energy. That is, in the process flow shown in FIG. 2, step S2 and step S3 are performed in parallel. As the method of applying vibration, the above method is used.

Specifically, in step S2, the vibration is applied by the method described above, and at the same time, the soft magnetic powder is irradiated with ultraviolet rays as the application of the energy in step S3. As an ultraviolet source, an ultraviolet lamp, an ultraviolet light emitting diode, an excimer lamp, or the like is used. An atmosphere for irradiating the soft magnetic powder with the ultraviolet rays is, for example, air, oxygen, or nitrogen. A wavelength of the ultraviolet rays for irradiation is not particularly limited as long as the dangling bond can be generated in the insulating body, but is, for example, 100 nm or more and 360 nm or less. A time for the irradiation with the ultraviolet rays is appropriately adjusted according to a type of a material for forming the insulating body, the wavelength of the ultraviolet rays for irradiation, or the like. The energy applied at the same time as the vibration is not limited to the ultraviolet rays.

The steps other than those described above are carried out in the same manner as the method for manufacturing the dust core 1 according to the first embodiment, and the dust core according to the present embodiment is manufactured.

According to the present embodiment, the following effects in addition to the effects according to the first embodiment can be obtained.

By applying the vibration and the energy at the same time, the peptization and the rotation of the soft magnetic powder and the generation of the dangling bond are performed in parallel. That is, the energy is applied to each surface of the soft magnetic powder while the bias is prevented. Therefore, the division of the molecular chain in the insulating body can be promoted. Further, since a device is simpler than the plasma treatment or the ozone treatment, the ultraviolet irradiation treatment can be easily performed at the same time as the vibration is applied.

4. Examples and Comparative Examples

Hereinafter, the effects of the present disclosure will be described in more detail with reference to Examples and Comparative Examples. The present disclosure is not limited to the following examples.

4.1. Manufacture of Dust Core for Evaluation

Dust cores of Examples 1 to 7 and Comparative Examples 1 to 4 are manufactured. Hereinafter, a specific manufacturing method will be described. Examples 1 to 7 are collectively referred to as Examples, and Comparative Examples 1 to 4 are collectively referred to as Comparative Examples. Table 1 shows a forming material, an average particle size, presence or absence of heat treatment described later, presence or absence of the insulating coating film, and an evaluation result of the iron loss for each of the soft magnetic powders of Examples and Comparative Examples. The soft magnetic powders of Examples are provided with the insulating coating film, and the soft magnetic powders of Comparative Examples are not provided with the insulating coating film.

TABLE 1

| | Material for forming soft magnetic powder | Average particle size [μm] | Heat treatment | Insulating coating film | Evaluation result of iron loss |
|---|---|---|---|---|---|
| Example 1 | Fe-50Ni | 24 | Absence | Presence | A |
| Example 2 | Fe-50Ni | 24 | Presence | Presence | A |
| Example 3 | Fe-5.5Al-9.5Si | 36 | Absence | Presence | B |
| Example 4 | Fe-5.5Al-9.5Si | 36 | Presence | Presence | B |
| Example 5 | Fe-4Al-1Cr | 13 | Absence | Presence | A |
| Example 6 | Fe-4Al-1Cr | 13 | Presence | Presence | A |
| Example 7 | Fe-12Si-10B-3Mn-1C | 82 | Absence | Presence | AAA |
| Comparative Example 1 | Fe-50Ni | 24 | Absence | Absence | C |
| Comparative Example 2 | Fe-5.5Al-9.5Si | 36 | Absence | Absence | C |
| Comparative Example 3 | Fe-4Al-1Cr | 13 | Absence | Absence | C |
| Comparative Example 4 | Fe-12Si-10B-3Mn-1C | 82 | Absence | Absence | AA |

As shown in Table 1, Fe-50Ni powder of the Fe—Ni-based alloy manufactured by the atomizing method was used as the material for forming the soft magnetic powder of Example 1. The average particle size of the powder was 24 μm as a result of measurement by the above method.

The powder was coated with the trimethoxyaluminum as the insulating body by the ALD method. Specifically, the insulating coating film was formed as follows. First, the powder was charged in the vacuum chamber set at 0.1 Pa and 85° C., and the trimethoxyaluminum was introduced at a flow rate of 100 sccm for 1 minute. Then, the nitrogen gas was introduced at a flow rate of 100 sccm for 3 minutes to replace the trimethoxyaluminum. Next, ozone was introduced at a flow rate of 500 sccm for 1 minute, and then the nitrogen gas was introduced at a flow rate of 100 sccm for 3 minutes for replacement. The introduction and the replacement of the trimethoxyaluminum and the introduction and the replacement of ozone were repeated 40 times to deposit the insulating coating film. A film thickness of the insulating coating film was about 4 nm as a result of the measurement by the above method.

Next, the vibration and the energy were simultaneously applied to the soft magnetic powder on which the insulating coating film was formed. Specifically, a rotating drum device including an opening was provided in the vacuum chamber equipped with a quartz window. The soft magnetic powder was charged into the rotating drum device to create a vacuum of 10 Pa in the vacuum chamber. The rotating drum device was rotated at about 30 rpm to apply the vibration to the soft magnetic powder. At the same time, the soft magnetic powder was irradiated with the ultraviolet rays from the outside of the vacuum chamber through the quartz window of the vacuum chamber and the opening of the rotating drum device with the excimer lamp. The wavelength of the ultraviolet rays was 172 nm. The above treatment was carried out for about 6 minutes.

Next, the inside of the vacuum chamber was set to a nitrogen gas atmosphere with a dew point of −10° C. under the atmospheric pressure. Then, the soft magnetic powder to which the vibration and the energy are applied was exposed to the atmosphere for about 10 minutes.

Next, the soft magnetic powder subjected to the above treatment formed the molded product. Specifically, the magnetic powder was press-molded into a ring shape having an outer diameter φ of 28 mm, an inner diameter of 14 mm, and a thickness of 11 mm by pressing at 300 MPa. Then, the firing was performed in air at 200° C. for 3 hours. Accordingly, a toroidal core, that is, the dust core of Example 1 was obtained. Next, a copper wire having a wire diameter of 0.5 mm coated with an insulating resin was wound around the toroidal core with a number of turns of 30 on both a primary side and a secondary side to obtain a toroidal coil of Example 1.

In Example 2, Fe-50Ni powder, that is, the material for forming the soft magnetic powder was heat-treated. Specifically, the powder was heated at 800° C. for 4 hours in the nitrogen gas atmosphere having an oxygen concentration of about 80 ppm. An oxide film was formed on the surface of the powder due to a small amount of oxygen in the nitrogen gas. The dust core and a toroidal coil of Example 2 were manufactured in the same manner as in Example 1 except that the heat treatment was performed.

As a material for forming the soft magnetic powder of Example 3, Fe-5.5Al-9.5Si powder of the Fe—Si—Al-based alloy was used. The average particle size of the powder was 36 μm as a result of the measurement in the same manner as in Example 1. The dust core and a toroidal coil of Example 3 were manufactured in the same manner as in Example 1 except that the material for forming the soft magnetic powder was changed.

In Example 4, the dust core and a toroidal coil of Example 4 were manufactured in the same manner as in Example 2 except that the same Fe-5.5Al-9.5Si powder as in Example 3 was used as the material for forming the soft magnetic powder.

As a material for forming the soft magnetic powder of Example 5, Fe-4Al-1Cr powder of the Fe—Cr—Al-based alloy was used. The average particle size of the powder was 13 μm as a result of the measurement in the same manner as in Example 1. The dust core and a toroidal coil of Example 5 were manufactured in the same manner as in Example 1 except that the material for forming the soft magnetic powder was changed.

In Example 6, the dust core and a toroidal coil of Example 6 were manufactured in the same manner as in Example 2 except that the same Fe-4Al-1Cr powder as in Example 5 was used as the material for forming the soft magnetic powder.

As a material for forming the soft magnetic powder of Example 7, Fe-12Si-10B-3Mn-1C powder of Fe—Si—B—Mn—C-based alloy was used. The average particle size of the powder was 82 μm as a result of the measurement in the same manner as in Example 1. The dust core and a toroidal coil of Example 7 were manufactured in the same manner as in Example 1 except that the material for forming the soft magnetic powder was changed. The Fe-12Si-10B-3Mn-1C powder was the amorphous powder and had the amorphous phase.

As a material for forming the soft magnetic powder of Comparative Example 1, Fe-50Ni powder the same as in Example 1 was used. Since the soft magnetic powders of Comparative Examples did not form the insulating coating film, the dust core was manufactured from the powder itself.

First, a toluene solution of an epoxy resin as the resin binder was added to the powder so that an addition amount of the epoxy resin in a solid content was 2.0 mass %. The toluene solution and the powder were mixed and dried to form a lump. After crushing the lump, coarse particles were removed with a sieve having a mesh size of 600 μm to obtain a granulated powder. Then, the granulated powder was press-molded into the ring shape having the same shape as that of Example 1 by pressing at 2 GPa. Then, the firing was performed in air at 450° C. for 30 minutes. Accordingly, a toroidal core, that is, the dust core of Comparative Example 1 was obtained. Next, the copper wire was wound around the toroidal core in the same manner as in Example 1 to obtain a toroidal coil of Comparative Example 1.

The dust core and a toroidal coil of Comparative Example 2 were manufactured in the same manner as in Comparative Example 1 except that Fe-5.5Al-9.5Si powder the same as in Example 3 was used as a material for forming the soft magnetic powder of Comparative Example 2.

The dust core and a toroidal coil of Comparative Example 3 were manufactured in the same manner as in Comparative Example 1 except that Fe-4Al-1Cr powder the same as in Example 5 was used as a material for forming the soft magnetic powder of Comparative Example 3.

The dust core and a toroidal coil of Comparative Example 4 were manufactured in the same manner as in Comparative Example 1 except that Fe-12Si-10B-3Mn-1C powder the same as in Example 7 was used as a material for forming the soft magnetic powder of Comparative Example 4.

4.2. Evaluation of Dust Core

The iron loss of the dust cores of Examples and Comparative Examples was evaluated. Specifically, for the toroidal coils of Examples and Comparative Examples, a core loss, that is, the iron loss was measured at the maximum magnetic flux density of 50 mT and the frequency of 50 kHz. Obtained core loss values were evaluated according to the following evaluation criteria, and results thereof were shown in Table 1.

AAA: A core loss value is 5 kW/m$^3$ or more and less than 60 kW/m$^3$.

AA: A core loss value is 60 kW/m$^3$ or more and less than 200 kW/m$^3$.

A: A core loss value is 200 kW/m$^3$ or more and less than 230 kW/m$^3$.

B: A core loss value is 230 kW/m$^3$ or more and less than 270 kW/m$^3$.

C: A core loss value is 270 kW/m$^3$ or more.

As shown in Table 1, in the dust cores of Examples, all levels are equal to or higher than B rating corresponding to an acceptable level. In particular, in Examples other than Example 3 and Example 4, the evaluation is A rating or higher corresponding to an excellent level. On the other hand, it is found that the dust cores of Comparative Examples have C rating corresponding to an unacceptable level except for Comparative Example 4, and the iron loss is increased as compared with Examples using the same materials for forming the soft magnetic powder.

Although the dust core of Comparative Example 4 is evaluated as AA rating, the iron loss is increased as compared with Example 7 in which the same material for forming the soft magnetic powder is used. It is considered that the reason is due to a fact that the crystallization of the amorphous phase is progressed and that the insulating coating film is not provided since the firing temperature is higher than that of Example 7.

In addition to the above, since the soft magnetic powder of Comparative Example 4 has an average particle size larger than other levels, a problem of deterioration in moldability when forming the molded product is likely to occur. Further, due to the problem, the eddy current loss is likely to increase on a high frequency side and an adverse effect of the increase in the iron loss is likely to occur. From these results, it is shown that the dust cores of Examples have a reduced iron loss as compared with the dust cores of Comparative Examples.

What is claimed is:

1. A method for manufacturing a dust core, comprising:

coating particles of a soft magnetic powder with an insulating body, the insulating body containing a compound having an aluminum-oxygen bond;

after coating the particles of the soft magnetic powder with the insulating body, subjecting a surface of the particles of the soft magnetic powder coated with the insulating body to irradiation with ultraviolet rays or subjecting the soft magnetic powder to an ionized gas or an ozone gas;

after subjecting the surface of the particles of the soft magnetic powder coated with the insulating body to irradiation with ultraviolet rays or subjecting the soft magnetic powder to an ionized gas or an ozone gas, exposing the soft magnetic powder to an atmosphere having a dew point of −30° C. or higher and 15° C. or lower under an atmospheric pressure; and forming a molded product by pressing the soft magnetic powder at 20 MPa or more and 400 MPa or less, wherein the compound having the aluminum-oxygen bond is selected from the group consisting of trimethoxyaluminum, triethoxyaluminum, and polymethylaluminoxane.

2. The method for manufacturing a dust core according to claim 1, further comprising:

firing the molded product at a temperature of 100° C. or higher and 400° C. or lower.

3. The method for manufacturing a dust core according to claim 1, further comprising:

applying vibration to the soft magnetic powder before the subjecting the surface of the particles of the soft magnetic powder coated with the insulating body to irradiation with ultraviolet rays or the subjecting the soft magnetic powder to the ionized gas or the ozone gas.

4. The method for manufacturing a dust core according to claim 1, wherein in the subjecting the surface of the particles of the soft magnetic powder coated with the insulating body to irradiation with ultraviolet rays or the subjecting the soft magnetic powder to the ionized gas or the ozone gas, vibration is applied to the soft magnetic powder at the same time.

5. The method for manufacturing a dust core according to claim 1, wherein the soft magnetic powder has an amorphous phase.

* * * * *